US 8,624,776 B2

(12) United States Patent
Jales et al.

(10) Patent No.: US 8,624,776 B2
(45) Date of Patent: Jan. 7, 2014

(54) DIGITAL RADAR OR SONAR APPARATUS

(75) Inventors: Richard Jales, Hampshire (GB);
Andrew Lawrence, Hampshire (GB);
Matthieu Maindrou, Hampshire (GB)

(73) Assignee: Raymarine UK Limited, Portsmouth (GB)

( * ) Notice: Subject to any disclaimer, the term of this patent is extended or adjusted under 35 U.S.C. 154(b) by 563 days.

(21) Appl. No.: 12/673,796

(22) PCT Filed: Aug. 29, 2008

(86) PCT No.: PCT/GB2008/002935
§ 371 (c)(1),
(2), (4) Date: Jan. 10, 2011

(87) PCT Pub. No.: WO2009/027693
PCT Pub. Date: Mar. 5, 2009

(65) Prior Publication Data
US 2011/0102244 A1  May 5, 2011

(30) Foreign Application Priority Data

Aug. 31, 2007  (GB) .................................. 0717031.9

(51) Int. Cl.
*G01S 13/08* (2006.01)
*G01S 13/58* (2006.01)
*G01S 13/00* (2006.01)

(52) U.S. Cl.
USPC ........... 342/134; 342/104; 342/115; 342/118; 342/135; 342/175; 342/195

(58) Field of Classification Search
USPC ......... 342/104, 115, 118, 134–144, 175, 176, 342/179
See application file for complete search history.

(56) References Cited

U.S. PATENT DOCUMENTS 3,727,222 A * 4/1973 Hollis .............................. 342/80
3,961,329 A * 6/1976 Naidich ......................... 342/142
(Continued)

FOREIGN PATENT DOCUMENTS

CA        1194601      10/1985
CN       101089917     5/2009
(Continued)

OTHER PUBLICATIONS

Spie, PO Box 10 Bellingham WA 98227-0010, USA, 2006.
(Continued)

*Primary Examiner* — Jack W Keith
*Assistant Examiner* — Peter Bythrow
(74) *Attorney, Agent, or Firm* — Haynes and Boone, LLP

(57) ABSTRACT

A radar or sonar system amplifies the signal received by an antenna of the radar system or a transducer of the sonar system is amplified and then subject to linear demodulation by a linear receiver. There may be an anti-aliasing filter and an analog-to-digital converter between the amplifier and the linear receiver. The system may also have a digital signal processor with a network stack running in the processor. That processor may also have a network interface media access controller, where the system operates at different ranges, the modulator may produce pulses of two pulse patterns differing in pulse duration and inter-pulse spacing, those pulse patterns are introduced and used to form two radar images with the two images being derived from data acquired in a duration not more than twenty times larger than the larger inter-pulse spacing, or for a radar system, larger than one half of the antenna resolution time. One or more look-up tables may be used to control the amplifier. The radar system may generate digital output which comprises greater than eight levels of radar video.

20 Claims, 10 Drawing Sheets

(56) References Cited

U.S. PATENT DOCUMENTS

| | | | |
|---|---|---|---|
| 3,979,555 A * | 9/1976 | Opittek et al. | 348/672 |
| 4,001,823 A * | 1/1977 | Matsui et al. | 342/90 |
| 4,144,489 A * | 3/1979 | Ward et al. | 324/76.62 |
| 4,158,840 A * | 6/1979 | Schwab | 342/52 |
| 4,338,604 A * | 7/1982 | Petitjean | 342/201 |
| 4,352,105 A * | 9/1982 | Harney | 250/338.1 |
| 4,475,400 A * | 10/1984 | Flax | 73/631 |
| 4,598,293 A * | 7/1986 | Wong | 342/201 |
| 4,651,152 A | 3/1987 | Harmuth | |
| 4,652,874 A * | 3/1987 | Loyer | 370/451 |
| 4,829,307 A * | 5/1989 | Jacomini | 342/159 |
| 4,829,308 A * | 5/1989 | Tol et al. | 342/185 |
| 4,837,579 A * | 6/1989 | Pease et al. | 342/197 |
| 4,845,501 A * | 7/1989 | Pease et al. | 342/185 |
| 5,031,157 A * | 7/1991 | Anderson et al. | 367/110 |
| 5,047,775 A * | 9/1991 | Alitz | 342/26 D |
| 5,057,845 A * | 10/1991 | Gellekink | 342/137 |
| 5,057,846 A | 10/1991 | Harmuth | |
| 5,179,542 A * | 1/1993 | Reese et al. | 367/135 |
| 5,212,767 A | 5/1993 | Higashino et al. | |
| 5,281,971 A | 1/1994 | Moulton | |
| 5,309,161 A * | 5/1994 | Urkowitz et al. | 342/132 |
| 5,347,281 A * | 9/1994 | Lewis et al. | 342/160 |
| 5,406,842 A * | 4/1995 | Locke | 73/290 R |
| 5,446,461 A * | 8/1995 | Frazier | 342/22 |
| 5,457,394 A * | 10/1995 | McEwan | 324/642 |
| 5,501,221 A * | 3/1996 | Foster et al. | 600/437 |
| 5,543,799 A * | 8/1996 | Heger | 342/85 |
| 5,546,091 A * | 8/1996 | Haugen et al. | 342/181 |
| 5,659,320 A * | 8/1997 | Pouit | 342/115 |
| 5,793,327 A * | 8/1998 | Carnes et al. | 342/135 |
| 5,812,700 A | 9/1998 | Fang et al. | |
| 5,818,371 A * | 10/1998 | Lu et al. | 341/122 |
| 5,867,121 A * | 2/1999 | Erickson et al. | 342/185 |
| 5,905,380 A * | 5/1999 | Weiner et al. | 324/644 |
| 5,907,568 A * | 5/1999 | Reitan, Jr. | 342/26 B |
| 5,914,683 A * | 6/1999 | O'Conner | 342/127 |
| 5,964,708 A * | 10/1999 | Freeman et al. | 600/447 |
| 5,999,119 A * | 12/1999 | Carnes et al. | 342/135 |
| 6,037,892 A * | 3/2000 | Nikias et al. | 342/25 F |
| 6,064,334 A * | 5/2000 | Ikizyan et al. | 342/159 |
| 6,097,329 A * | 8/2000 | Wakayama | 342/26 D |
| 6,100,839 A * | 8/2000 | Heger et al. | 342/22 |
| 6,120,446 A * | 9/2000 | Ji et al. | 600/437 |
| 6,178,207 B1* | 1/2001 | Richards et al. | 375/259 |
| 6,198,428 B1* | 3/2001 | Sekine | 342/176 |
| 6,232,913 B1* | 5/2001 | Lehtinen | 342/137 |
| 6,297,764 B1* | 10/2001 | Wormington et al. | 342/101 |
| 6,313,781 B1 | 11/2001 | Lee | |
| 6,373,427 B1* | 4/2002 | Hohne | 342/128 |
| 6,392,588 B1* | 5/2002 | Levanon | 342/202 |
| 6,421,300 B1* | 7/2002 | Thomas et al. | 367/135 |
| 6,844,842 B2* | 1/2005 | Kroeger et al. | 342/70 |
| 6,864,830 B1 | 3/2005 | Billings | |
| 7,046,015 B2* | 5/2006 | Suginouchi et al. | 324/635 |
| 7,307,582 B2* | 12/2007 | Griessbaum et al. | 342/124 |
| 7,764,223 B2* | 7/2010 | Wade | 342/107 |
| 2003/0015666 A1* | 1/2003 | Morgan et al. | 250/398 |
| 2003/0156666 A1* | 8/2003 | Nichols | 375/345 |
| 2004/0109388 A1 | 6/2004 | Sogaard | |
| 2005/0169107 A1 | 8/2005 | Thomenius et al. | |
| 2006/0058035 A1 | 3/2006 | Tsuruno | |
| 2006/0122506 A1 | 6/2006 | Davies et al. | |
| 2006/0140291 A1* | 6/2006 | Thomas, Jr. | 375/260 |
| 2006/0235302 A1 | 10/2006 | Grossman et al. | |
| 2006/0238406 A1* | 10/2006 | Nohara et al. | 342/90 |
| 2007/0025183 A1* | 2/2007 | Zimmerman et al. | 367/88 |
| 2007/0132630 A1* | 6/2007 | Beckner | 342/22 |
| 2007/0164898 A1* | 7/2007 | Pan et al. | 342/104 |
| 2011/0102244 A1* | 5/2011 | Jales et al. | 342/135 |

FOREIGN PATENT DOCUMENTS

| | | |
|---|---|---|
| EP | 0184424 | 6/1986 |
| EP | 0184424 A2 * | 6/1986 |
| EP | 0320306 | 6/1989 |
| GB | 1329789 | 9/1973 |
| GB | 2115252 | 9/1983 |
| GB | 2214026 | 8/1989 |
| JP | 58002681 | 6/1981 |
| JP | 60209189 | 10/1985 |
| JP | 62-161071 | 7/1987 |
| JP | 02-186287 | 7/1990 |
| JP | A 4098179 | 3/1992 |
| JP | 08054476 | 8/1994 |
| JP | 09008822 | 1/1997 |
| WO | WO 00/40994 | 7/2000 |
| WO | WO01/88682 | 11/2001 |
| WO | WO 01/93434 | 12/2001 |
| WO | WO 03/100457 | 12/2003 |
| WO | WO 2006/123084 | 11/2006 |
| WO | WO2007/123836 | 11/2007 |
| WO | WO2008/063691 | 5/2008 |
| WO | WO2008/066876 | 5/2008 |

OTHER PUBLICATIONS

Skolnick et al., "Pulse Doppler Radar," Radar Handbook, pp. 19.12-19.17 (Jan. 1, 1970).

Y S Poberezlrskiy, "2007 IEEE Aerospace Conference", Mar. 3, 2007, IEEE, pp. 1-17, "On dynamic range of digital receivers".

* cited by examiner

DIGITAL RADAR OR SONAR APPARATUS

BACKGROUND OF THE INVENTION

1. Field of the Invention

The present invention relates to a radar or sonar apparatus. It is particularly concerned with such an apparatus including digital processing of the radar or sonar signals received

2. Summary of the Prior Art

Radar scanners have been manufactured since the 1940's. The development of radar has diverged into two methods, non-coherent pulse radars and Doppler radars. Doppler radars have received considerable development for military and aviation use. Modern Doppler radars make extensive use of digital signal processing and digital control. However pulse radars have remained extensively analog, using logarithmic receivers and analog gain controls to generate baseband video that is sent to the display for processing. The display converts the baseband video to digital form using a 1-bit comparator. Any signal processing that takes place in such displays is limited by the thresholding that take place in the comparator. Analogue processing and control has hereto been cheaper and adequate for most purposes.

Radar receivers have historically been based upon down conversion from S-band or X-band to an intermediate frequency (IF) of the order of 60 MHz. The signal at the intermediate frequency (IF) is then subject to IF filtering and analog logarithmic demodulation to baseband "video", followed by baseband filtering. The radar signal processor is often placed in radar display apparatus, rather than the scanner itself. This is because there are size, weight and power constraints on the radar scanner enclosure. The scanner is exposed to the worst of the environment, whereas the display enclosure is often placed in a more benign environment such as a heated cockpit. When multiple displays are used, the radar information is typically sent out over a network, the radar signal processors, in the each display apparatus not connected directly to the scanner, are idle and redundant.

Analog IF filters are used for conventional mono-pulse radars. The optimum bandwidth for the IF filter $(BW)=1/T$, where T is the pulse-width.

The pulse-width is optimised for range resolution and average power. Short pulses are used for short range, where the highest range resolution is needed and the return signals are strongest. Long pulses are used when the absolute range resolution can be reduced, but higher transmit power is needed due to the lower power of the return signal.

The returned signal power is:

$$s=k/R^4$$

Where k is a constant and R is range

The range resolution of the display limits the displayable range resolution to a maximum proportion of the range say $1/1024$. Thus at longer ranges the absolute range resolution can be reduced. It should be noted that increasing the range resolution reduces clutter; the excess number of range bins can be combined in the signal processor prior to display. Pulses of this optimum transmitted pulse-width are selected when the user changes instrumented range.

When a large number of different pulse-widths (say 8) are available, providing matched analog filtering becomes onerous to set-up, and liable to drift. Hence it is normal to provide a compromise sub-set of filter bandwidths, and use each one to cover several pulse widths. This leads to sub-optimal filtering. Analog video filtering follows detection to remove the spurious products that arise from the use of a logarithmic detector. The analog video loss-pass filter works at baseband and is required to have wide bandwidth to cut-off frequency ratio, yet have linear phase, so video filtering is minimal.

The radar signal requires conversion from analog to digital form using an Analog to Digital Converter (ADC) or more often just a comparator. The signal is required to be in digital form for use with a raster graphic display such as a CRT or LCD. This is because it has to be (scan) converted from polar (Range, Azimuth) to Cartesian co-ordinates (x, y). Prior to conversion low-pass video filtering is required to avoid aliasing artefacts. The log processing of the amplitude from a conventional radar receiver is a non-linear process, the output of which comprises many harmonics that have to be removed to avoid aliasing in the ADC. However as discussed above, the video filtering is minimal. The poor removal of these spurious products causes aliasing, and destroys information that could have been used in later signal processing, for enhancing the quality of the displayed information. The logarithmic baseband video precludes any signal processing that makes use of linear signals for example, Fast Fourier Transforms (FFTs).

Logarithmic detector receivers have historically had advantages in radar receivers due to their large dynamic range and are inherently CFAR (Constant False Alarm Rate). To ensure that these qualities are not compromised in a linear receiver, the dynamic range of the analog and analog-to-digital conversion must be very wide. Low noise pre-amplifier components, a high speed, high resolution (large numbers of bits) analog-to-digital conversion, very fast digital filters and ideally a floating-point processing digital signal processor (DSP) must be used. These have been expensive and difficult to use. Thus linear detection and processing have not previously been considered, being both uneconomic and unreliable (due to high power dissipation).

Dual range scanners are available, which allow the display of separate radar plan position indicators (PPIs), which are the conventional radar displays. However, in such scanners the scanner makes more than one full rotation using each pulse type, with the receiver optimised for the reception of one pulse type at a time. The displays from each range have the disadvantage of clearly not being simultaneously updated, which creates an ambiguity. Time is allowed for the receiver and transmitter characteristics to be changed, resulting is a period when no pulses are transmitted or received on any range. There is a resulting loss of information.

FIG. 1 of the accompanying drawings shows a known radar apparatus. It comprises five principal components, namely a processor 10, a transmitter section 20, an antenna structure 30, a receiver structure 40 and a display structure 50. The processor 10 generates pulse initiation signals which are passed via a digital bus 11 to the transmitter section 20. The processor also generates signals for controlling the receiver section 40, which are passed from the processor 10 to the receiver section 40 via a second digital signal bus 12.

The pulse initiation signals from the processor 10 are received at a pulse duration unit 21 in the transmitter section 20, which determines the pulse width of the pulses to be generated. The pulses are initiated by an edge of the pulse initiation signal, and their duration is thus fixed. The resulting pulse information is passed to a modulator 22 which drives a magnetron transmitter 23. That magnetron transmitter 23 is normally a vacuum device that produces high power microwave pulses, which will form the radar signals. Those microwave pulses are passed from the magnetron 23 via a band pass filter 24 which controls spurious emissions from the magnetron 23 to a circulator 25. That circulator acts as a switching unit and, at appropriate times, passes the microwave pulse to an antenna 31, from which they are transmitted. The antenna 31 is arranged to rotate, and has a rotary joint 32 and a motor 33 which drives the antenna at a predetermined rotation speed. The motor 33 is driven from a drive 34 which is powered from the modulator 22. The rotary joint 32 acts as a microwave connection between the rotating antenna and the circulator 25.

When return signals are received at the antenna 31, they are passed via the circulator 25 to a low noise converter 41 which converts the signals to an appropriate frequency. Generally, the magnetron will produce pulses in the X-band region sent on 9.4 GHz, in which case the low noise converter 41 will convert the received X-band signals to an IF frequency, such as 60 MHz. Note that the circulator 25 switches between the pulses for transmission from the magnetron 23 and the received signals received by the antenna 31 which are passed to the low noise converter 41. The signals from the low noise converter 41 are passed to a PIN diode attenuator 42 which is controlled by a Time Varying Gain (TVG) generator 43 which is controlled by the processor 10 on the basis of the signals passed via bus 12. That TVG generator 43 controls the gain of the receiver section 40 to compensate for range variation of the signal received by the antenna 31. The TVG generator 43 also controls a variable amplifier 44 which receives the output of the PIN attenuator 42 and controls the IF gain of the received signal. The output of the variable gain amplifier 44 is passed to a log detector 45 which generates an output which is the logarithm of the envelope with a received signal. That output is passed to a selectable band filter (video filter 46) which generates the output to the display section 50.

As illustrated in FIG. 1, the display section contains multiple display structures, each of which comprises a comparator 51, a spoke buffer 52, a signal processor 53 and a graphical display 54. However, in the arrangement shown in FIG. 1, all but one of those multiple display structures is mostly redundant. Thus, in FIG. 1, the output of the video filter 46 is received by a first display structure 55, comprising comparator 51, spoke buffer 52, signal processor 53 and display unit 54. The comparator 51 generates a digital output that changes when the input signal crosses a predefined voltage threshold. The spoke buffer 52 then receives the output of the comparator 51, and stores a digital representation of the signal received as a function of time. The digital signals stored in the spoke buffer 52 are then processed by the signal processor 53 to generate a signal to the display unit 54. However, those signals to the display unit 54 are also passed directly to the display unit 54 of a second display structure 56. In that display structure 56, the comparator 51, spoke buffer 52 and signal processor 53 are redundant. It would similarly be possible to provide more display structures operating a similar way.

In a sonar system, the structure is similar but the antenna is replaced by a sonar transducer which transmits and receives the sonar signals. That transducer does not rotate, unlike the antenna 31. Moreover, it would normally be desirable for the magnetron 23 to be replaced by a high power RF pulse generator. In addition, since the velocity of proportion of acoustic waves in water is substantially slower than radio waves propagating through air, and the maximum range of targets to be detected by a sonar system is normally less than the maximum range to be detected in a radar system, the pulse repetition intervals and the pulse widths used in a sonar system will be different from those used in a radar system.

SUMMARY OF THE INVENTION

The present invention seeks to improve known radar and/or sonar systems and has a series of aspects which may be used independently, or in combination, in the radar or sonar system. Each aspect may provide additional features to a basic antenna or sonar structure, which includes the principal features of any radar or sonar apparatus.

Thus, in the present invention the basic structure of a radar apparatus may comprise:
 a modulator for generating a sequence of pulse signals;
 a transmitter for converting the sequence of pulse signals to radar signals;
 an antenna for emitting the radar signals and receiving return signals;
 an amplifier for amplifying the return signals;
 a switching device for switchedly interconnecting the transmitter to the antenna and the antenna to the amplifier; and
 a signal processor processing the amplified return signals for display and/or analysis.

Similarly, the basic structure of a sonar apparatus may comprise:
 a modulator for generating a sequence of pulse signals;
 a transmitter for converting the sequence of pulse signals to sonar signals;
 a transducer for emitting the sonar signals and receiving return signals;
 an amplifier for amplifying the return signals;
 a switching device for switchedly interconnecting the transmitter to the transducer and the transducer to the amplifier; and
 a signal processor for processing the amplified return signals for display and/or analysis.

It can thus be seen that the basic structure of the sonar apparatus differs from the basic structure of the radar apparatus in the replacement of the antenna (normally a rotating antenna) of the radar apparatus by a transducer.

The first aspect of the present invention proposes that the signal received by the antenna or transducer of the radar or sonar apparatus is, after amplification, subject to linear demodulation. The resulting demodulated signal is then used to generate a display or may be analysed further.

Thus, this first aspect may provide a radar or sonar apparatus with the basic structure discussed above, having a linear receiver between the amplifier and the signal processor, the linear receiver including a linear demodulator generating a digital output representing said amplified return signals for processing by the signal processor.

A linear receiver is normally a receiver comprising linear amplifiers and linear demodulator. The output signal is linearly proportional to the amplitude of the incoming signal. Non-linear receivers include, for example, logarithmic and square law demodulators. Similarly, a linear demodulator is normally a demodulator that produces an output signal, in either digital or analog form, that is linearly proportional to the amplitude of the incoming signal. It may also provide a signal that shows the phase of the incoming signal, with timing referenced to a local oscillator.

The second aspect of the invention also considers the signals received by the antenna or transducer of the radar or sonar, and proposes that those signals after amplification are filtered using an anti-aliasing filter and converted from analog to digital format via a sub-sampling converter.

Thus, in the second aspect, there may be provided a radar or sonar apparatus with the basic structure discussed above, having an anti-aliasing filter connected to the amplifier for filtering the amplified return signals and sub-sampling analog-to-digital converter for converting the filtered digital signals to digital signals, said digital signals being supplied to the signal processor.

An anti-aliasing filter is a device which is normally used before an analog-to-digital converter, and permits the bandwidth of a signal to be restricted approximately to satisfy the Shannon-Nyquist-Kotelnikov sampling theorem. The theory requires that exact reconstruction of a continuous-time baseband signal from its samples is possible if the signal is band-limited and the sampling frequency is greater than twice the signal bandwidth. In radar and sonar applications, the out of band signal primarily comprises white, thermal noise. To achieve a satisfactory signal to noise ratio, and provide an adequate approximation to the above criteria, the in-band signals should not be attenuated by more than 6 dB and the potentially aliased signals be attenuated in excess of 30 dB.

As mentioned above, the first and second aspects may be independent. However, where they are used in combination, the anti-aliasing filter and the analog-to-digital converter are between the amplifier and the linear receiver.

In the second aspect, the analog-to-digital converter produces a digital output suitable for down conversion to base band or for further digital signal processing. For example, the digital signal may be subject to digital filtering prior to be output to the signal processor. Where the pulses thus filtered have multiple pulse widths, the filtering may be in the form of matched filters.

Preferably, the analog-to-digital conversion, intermediate frequency (IF) filtering, and down conversion to base band, if used, are carried out in a single integrated circuit.

Preferably, the signal is subject to non-linear dynamic range matching prior to output. Non-linear dynamic range matching to any display follows the signal processing, not precedes it. The dynamic range of the radar signal, following signal processing, is still larger than the dynamic intensity range of the display. Dynamic range compression is used, but following the signal processing. A choice of algorithms for compression is then feasible, because the compression is performed in the signal processor. These can be log, square root, or in special cases, linear for no compression.

The third aspect of the invention is concerned with the signal processor. In this third aspect, at its most general, the signal processor is a digital one with a network stack running on that digital processor. This is to be contrasted with an arrangement in which a network stack runs on a separate communications processor.

Thus, the third aspect of the invention may provide a radar or sonar apparatus with the basic structure discussed above, having an anti-aliasing filter connected to the amplifier for filtering the amplified return signals, and an analog-to-digital converter for converting the filtered signals to digital signals, said digital signals being supplied to the signal processor, wherein the signal processor is a digital processor including a network stack running in the digital processor.

A network stack is a software implementation of a network communications protocol.

The fourth aspect of the invention also relates to the signal processor, and proposes that that processor is a digital one having a network interface media access controller and a physical layer interface. That media access controller may be connected directly or logically to a digital signal processor bus, possibly via bus buffers.

Thus, the fourth aspect of the invention may provide a radar or sonar apparatus with the basic structure discussed above, having an anti-aliasing filter connected to the amplifier for filtering the amplified return signals, and an analog-to-digital converter for converting the filtered signals to digital signals, said digital signals being supplied to the signal processor, wherein the signal processor is a digital signal processor having a network interface media access controller and physical layer interface that are connected to a digital signal processing bus.

A media access controller (MAC) in a component such as an electronic integrated circuit or functional block of a circuit that provides addressing and access control mechanisms that makes it possible for several network nodes to communicate within a multipoint communications network.

A physical layer interface (PHY) refers to an electronic integrated circuit or functional block of a circuit interfacing between digital signals, and a modulation in the analog domain at a communications network.

As mentioned above, it is known to provide a radar or sonar system in which different pulses are used to generate different images, e.g. images at different ranges. However, in general, the known systems have considered the pulses needed for the different ranges separately, so that one or other of the images is based on data that is significantly older than the data used to form the other image. The fifth aspect of the invention seeks to improve such arrangements, by interleaving the pulses for different ranges, which differ in pulse width and/or inter-pulse spacing, in which there is simultaneous display of images. In particular, the pulses are such that the data to form the display images are derived from data acquired in a duration not more than twenty times the longer of the inter-pulse periods of the different pulses. Alternatively, at least for a radar system, the data should not be acquired over a period longer than one half the antenna revolution time, as compared with the data for the other image. The latter is not applicable to a sonar, which does not have a rotating antenna.

Thus, in the fifth aspect of the invention, there may be provided a radar system with the basic structure discussed above, having an antenna drive for rotating the antenna with a predetermined revolution duration;

wherein the modulator is arranged to generate the sequence of pulse signals such that the sequence comprises pulses of a first pulse pattern and pulses of a second pulse pattern, the first and second pulse patterns differing in pulse duration and inter-pulse spacing, the first and second pulse patterns being interleaved such that within said predetermined revolution duration there are a plurality of pulses of each pulse type, and wherein the signal processor is arranged to generate a first radar image from said pulses of said first pulse type and a second radar image from said pulses of said second pulse type, such that the pulses forming each of said first and second images at any time are within a time not greater than one half of the predetermined revolution duration.

Similarly, this fifth aspect may provide a sonar system with the basic structure discussed above, wherein the modulator is arranged to generate the sequence of pulses and that the sequence comprises pulses of a first pulse pattern and pulses of a second pulse pattern, the first and second pulse patterns differing in pulse duration and pulse spacing, the first and second pulse patterns being interleaved and, wherein the signal processor is arranged to generate a first sonar image from said pulses of said first pulse type and a second sonar image of said pulses of said second pulse type, and that the pulses forming said first and second images at any time are within a time not greater than twenty times whichever is longer of the pulse spacing of the first and second pulse patterns.

The sixth aspect of the invention concerns the amplifier which amplifies the signals received by the antenna or transducer of the radar or sonar apparatus. In the sixth aspect, a look-up table is used to control the amplifier digitally.

Thus, in the sixth aspect, there may be provided a radar or sonar system with the basic structure discussed above, having a controller for controlling the gain of the amplifier, the controller including at least one look-up table containing data for compensating for range dependent variation of said return signals.

Normally, the range dependent variations for radar signals is $1/R^4$. However, this range dependency can depart from this function if there is rain or sea-clutter, so the variation needed is often a polynomial of range, or a combination of range dependent power laws. Thus, if the gain control of the receiver is non-linear, the look-up table contents will then be the product of the required functions.

Where the sixth aspect is used for a radar operating at multiple ranges, whether by use of the fifth aspect of the invention or some other way, control of the amplifier will need to take into account the multiple ranges. This can be done by the use of two or more look-up tables (the number depending on the number of ranges). Alternatively, however, the different ranges may be accommodated within a single look-up table, having different table regions corresponding to the different ranges. Then, the addresses used to acquire the data for controlling the amplifier will point to the required portion of the table, depending on the range at which the radar or sonar is currently operating. The use of a single look-up table with different table regions will normally be preferred.

Moreover, the use of multiple look-up tables, or a look-up table with multiple table regions, also permits updating. Thus, when data in one table or table region is being used, data in another table or table region may be up dated without affecting the current operation of the apparatus.

Where the amplifier has more than one gain stage, separate gain functions may be required for the stages. In this case, it is again possible to make use of multiple look-up tables, or to having a look-up table with different table regions for the different gain stages. Where separate look-up tables are used for gain control, the signal may be kept with the desired dynamic range by adding the outputs from the two types of tables, using saturation logic that keeps the signals used to control the amplifier within the gain control range. For example, a range of 0 to 255 may be used for an eight-bit gain control.

All the aspects of the invention discussed above are applicable to either radar or sonar systems. The seventh aspect of the invention is concerned with a radar system, and propose that the digital signal processor of the basic radar structure discussed above generates a digital output which comprises greater than eight levels of radar video. Preferably, a pseudo-colour representation of the targets in amplitude is displayed on the radar display. Preferably, there are more than sixteen levels of radar video.

With the present invention it is possible to produce a scanner with improved display of pulse radar or sonar data. The invention may make use of multi-bit digital signal processing with linear conversion to baseband. If digital control is used, this enables the scanner to combat the effects of temperature and ageing that affect analog circuitry.

BRIEF DESCRIPTION OF THE DRAWINGS

An embodiment of the present invention will now be described in detail, by way of example, with reference to the accompanying drawings in which.

DETAILED DESCRIPTION

Figure 1:
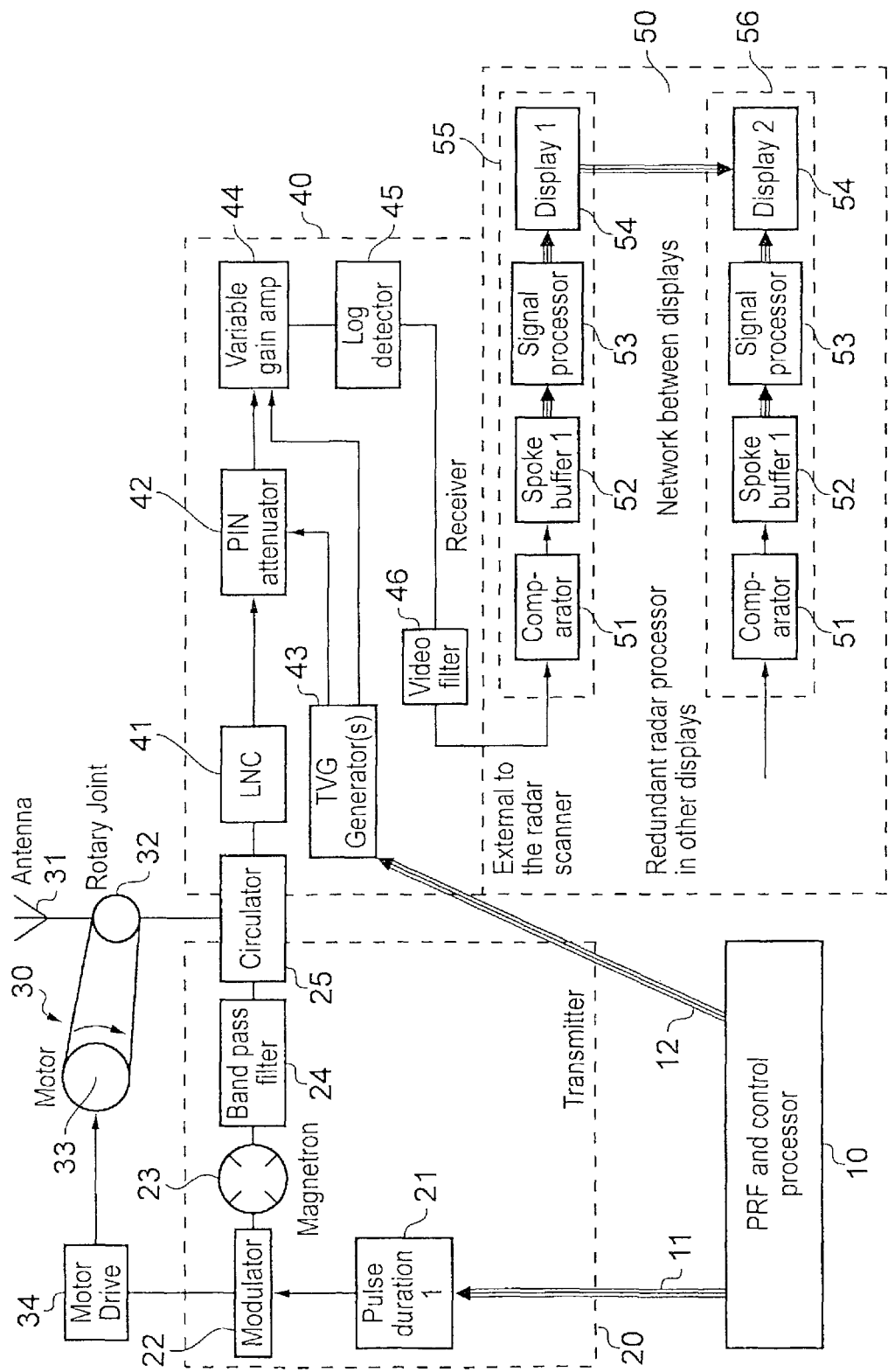
FIG. 1 is a block diagram of a known radar apparatus, and has already been described.

A radar apparatus embodying the various aspects of the invention will now be described in detail. FIG. 2 shows the general structure of the apparatus of this embodiment. As in the known arrangement of FIG. 1, the apparatus comprises five components, namely a control processor 100, a transmitter section 200, an antenna section 300, a receiver section 400, and a display section 500. Some of the sub-components of the transmitter section 200, antenna section 300, and receiver section 400 correspond to components of the transmitter section 20, the antenna section 30 and the receiver section 40 of the arrangement of FIG. 1, and the same reference numerals will be used for corresponding parts.

However, the apparatus of FIG. 2 is intended to generate multiple displays at different radar ranges. Thus, the control processor 100 generates two types of pulse repetition frequency signals which are transmitted via separate digital buses 101, 102 to separate pulse duration units 201, 202. Each of those pulse duration units 201, 202 determines the duration of the respected pulses, in a manner similar to pulse duration unit 21. However, the duration of the pulses generated by the pulse duration units 201, 202 will be different. The resulting signals are combined by a logical OR component 203 before being passed to the modulator 22. As will be described in more detail later, the pulses are generated so that they are interleaved, with the manner of interleaving being determined by the desired ranges of images to be displayed.

Figure 2:
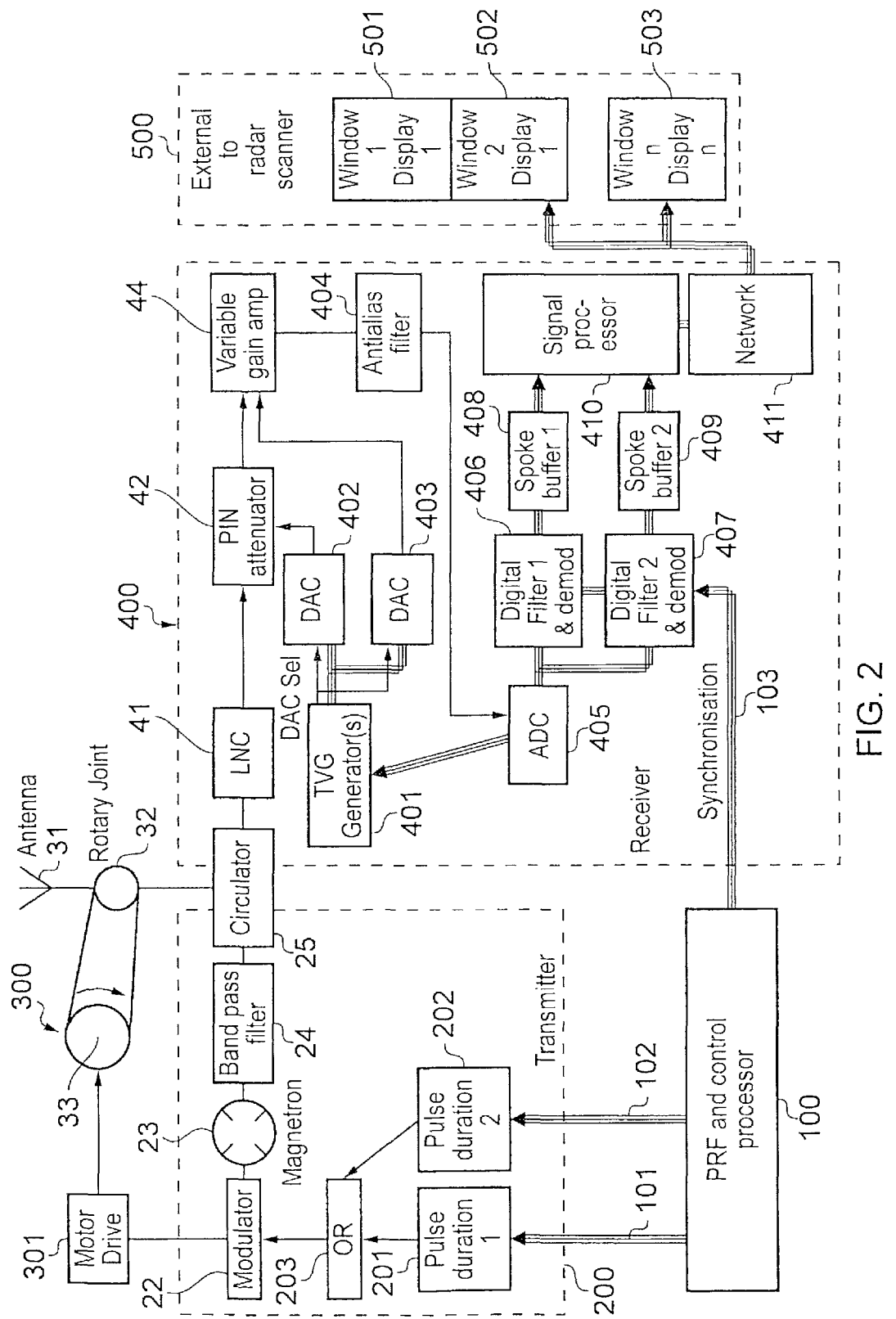
FIG. 2 is a block diagram of a radar apparatus embodying the present invention.

In the arrangement of FIG. 2, the structure of the antenna section 300 is similar to the antenna section 30 of the arrangement of FIG. 1. As in the arrangement of FIG. 1, signals received by the antenna 31 are passed via the circulator, a low noise converter (LNC) 41, a PIN attenuator 42 to a variable gain amplifier 44. However, the output of that variable gain amplifier 44 is processed in a different way from the arrangement of FIG. 1, as will be described in more detail later.

In the embodiment of FIG. 2, the time varying gain (TVG) generator 401 is implemented using a series of combination of fixed and variable gain amplifiers and a PIN diode attenuator. Again, the TVG generator 401 is controlled using signals from the control processor 100 via a digital bus 12. However, in this embodiment, the output of the TVG generator 401 is converted by respective digital-to-analog converters 402, 403 to control the PIN attenuator 42 and the variable gain amplifier 44 respectively.

Figure 3:
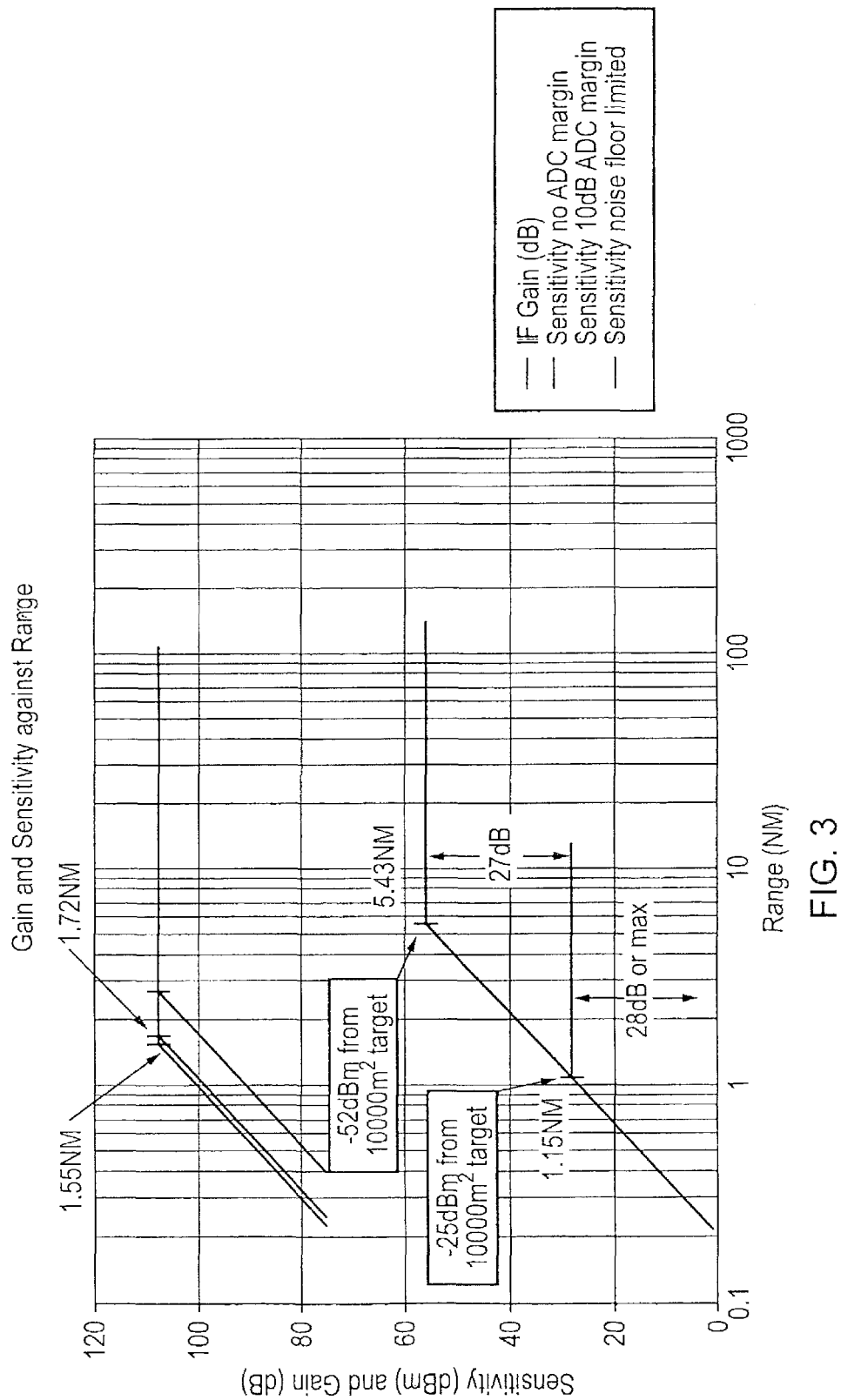
FIG. 3 is a graph of the relationship between gain and sensitivity of an amplifier against range.

FIG. 3 then illustrates the variation in gain sensitivity of the variable gain amplifier 44 which is needed for different ranges. These are controlled by the TVG generator 401.

A fixed frequency anti-alias filter 404 follows the variable gain amplifier 44 to restrict the input signal bandwidth to:

$$\text{Anti-alias filter bandwidth} = \text{IF frequency} +/- BW_{max}.$$

where $BW_{max}$ is the bandwidth required for the optimum reception of the shortest pulses and IF is the desired intermediate frequency. The anti-aliasing filter 404, as above, cannot have an infinite roll-off rate. However it is possible to let some signal through outside this range, including that which is aliased. This signal will comprise thermal (white) noise, interference and higher harmonics of the received target signal. The subsequent digital filtering will remove most of the aliased, distorted signal, when used with narrower bandwidths (longer pulses) when the lowest noise and best performance is required. Interference from other pulsed radars is rejected, even when aliased into the selected bandwidth. A correlation technique is used based on multiple radar pulses. The remaining white noise, aliased into the selected bandwidth, simply degrades the noise performance marginally according to the ratio of selected bandwidth to aliasing filter skirt.

The radar receiver described may use a single integrated circuit 14 bit ADC with integrated high-speed digital filter. The small size of this component and the high level of integration reduce the noise coupled into the low-noise front-end of the receiver.

Figure 4:
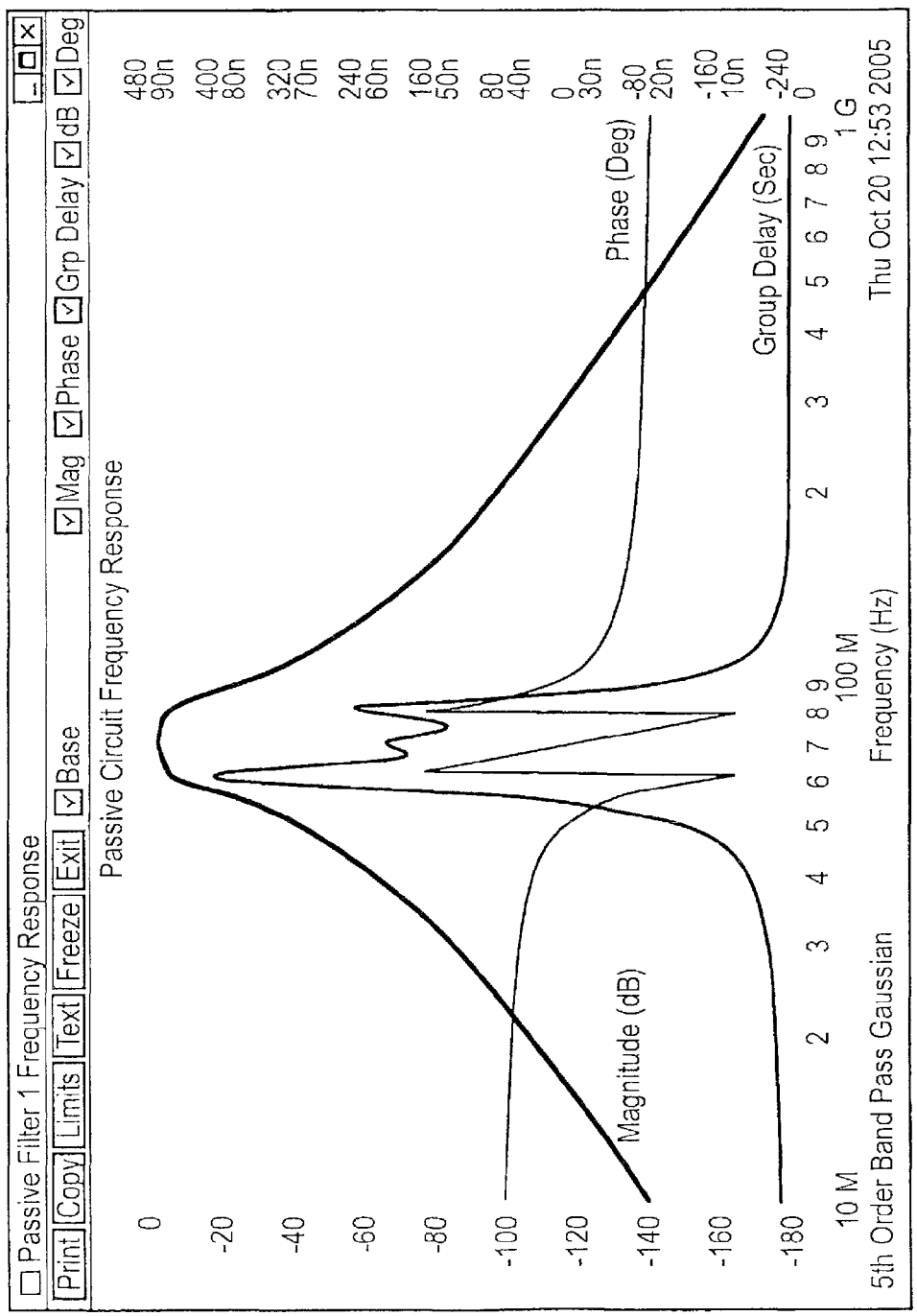
FIG. 4 is a graph showing the frequency characteristic of a filter of the embodiment to FIG. 2.

FIG. 4 then illustrates the frequency response of the anti-alias filter 404.

The output of the anti alias filter 404 is passed via an analog-to-digital converter 405 to respective digital filters 406, 407 for each range of the radar. Those digital filters 406, 407 receives synchronising signals from the control processor 100 via a digital bus 103. The outputs of those digital filters 406, 407 are passed via respective spoke buffers 408, 409 to a signal processor 410, which generates a network output via network unit 411 to the display section 500.

Figure 5:
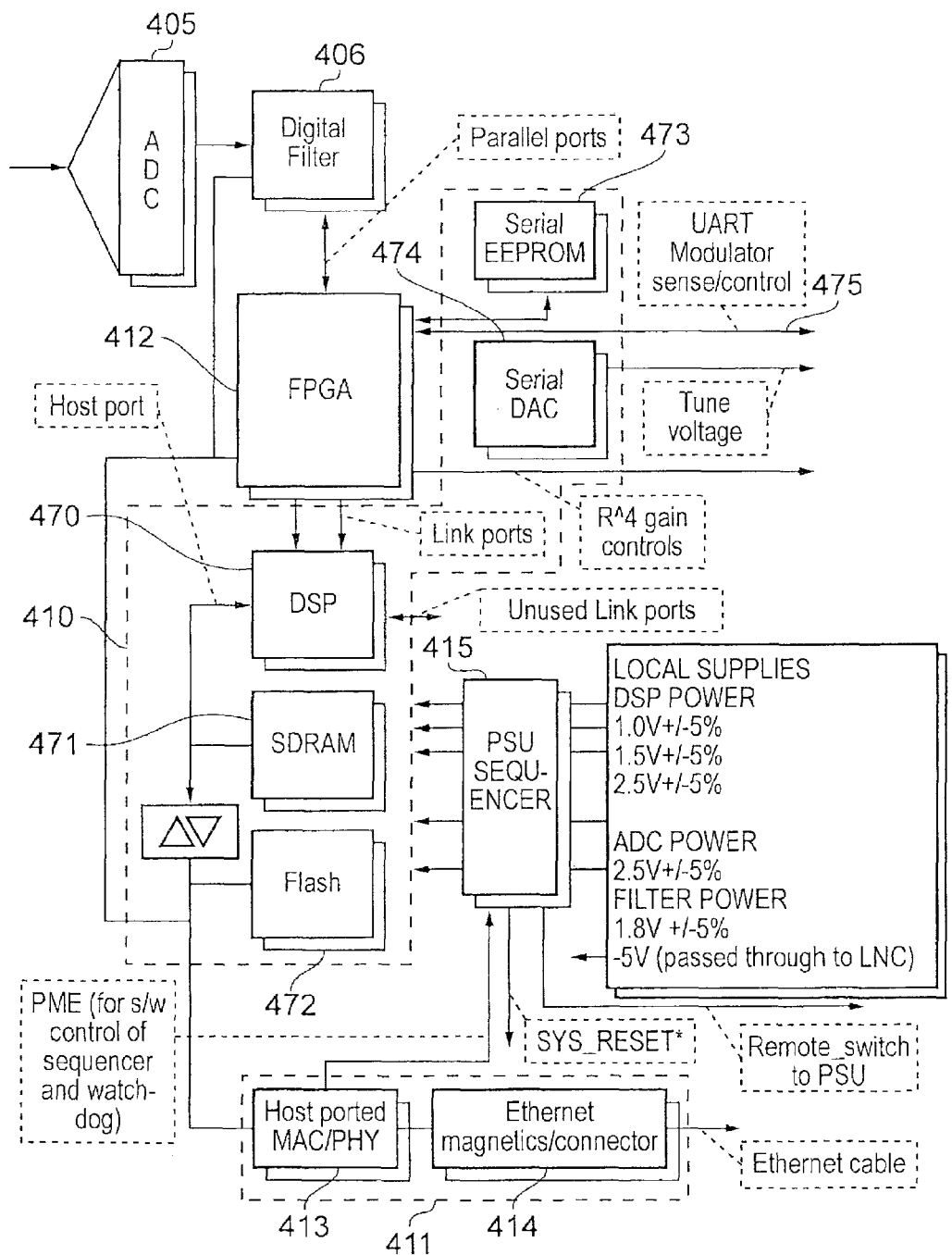
FIG. 5 is a block diagram showing part of the apparatus of FIG. 2.

FIG. 5 shows part of the apparatus of FIG. 2 in more detail. As shown in FIG. 5, the signal processor 410 comprises a digital processor (DSP) 470, a static random access memory (SRAM) 471, a flash memory 472, a serial EEPROM 473 and serial digital-to-analog converter 474.

FIG. 5 also shows a field programmable gate array (FPGA) 412 in which the TVG generator 401 and buffers 408, 409 are embodied. In fact, although shown as a separate component in FIG. 5, the digital filter 406 (and the digital filter 407) may also be embodied within the FPGA 412.

FIG. 5 also shows that the network unit 410 comprises a host ported media access controller (MAC) and physical layer interface (PHY) 413, and an Ethernet connector 414.

FIG. 5 also shows a sequencer 415 which controls the timing of the various components.

The FPGA 412 generates an output on line 475 which is passed to the control processor.

This embodiment uses a sub-sampling approach to reduce the analog-to-digital conversion sample rate. To facilitate sub-sampling, the IF frequency has been raised to 70 MHz. Without sub-sampling, the analog-to-digital conversion would require a minimum sample rate of 2*(70 MHz+(BW/2)) to satisfy the Nyquist criteria. For a 75 ns pulse, this equates to an analog-to-digital conversion sample rate of 2*76.6=153.2 MHz. High resolution analog-to-digital conversions working at this sample rate are expensive and may be subject to export restrictions. In practice the analog anti-alias filter 404 cannot have an infinite roll-off in the frequency domain, so the sample rate would need to be somewhat higher to avoid aliasing the signal in the skirt of the filter.

The embodiment described uses a 57 MHz sample rate. The under-sampling in the analog-to-digital conversion aliases the signal to: 13 MHz+/−BW/2. This sub-sampled signal is mixed in a complex mixer, also part of the digital filter IC, to produce a complex I,Q baseband signal. The complex base-band signal is then filtered in the digital filter to produce the matched bandwidth required of 0 Hz+/−BW/2 (The mixed signal is complex I,Q). Under-sampling reduces the cost of the analog-to-digital conversion and the processing and memory required.

When a large number of pulse-widths (say 8) is used, providing matched analog filtering becomes onerous to set-up, and liable to drift. This embodiment uses digital filtering of the IF, prior to conversion to base-band. Such digital filtering is linear and optimal; digitising then filtering conventional base-band log video cannot achieve the same result. In this design the entire digital signal processing, takes place in the linear domain, for which many processing algorithms are available (e.g. Fast Fourier Transform (FFT))

The digital filter 406 can be re-loaded with different parameters when the user changes instrumented range, such that the optimised matched bandwidth is always used on each instrumented range. Thus there is no restriction on the number of different pulse-widths that can be optimally filtered. Alternatively, two or more filters can be made simultaneously available and the output of these selected, on a pulse-by-pulse basis, according to the required range. These filters can be reloaded separately when the user changes one of the instrumented ranges.

Figure 6:
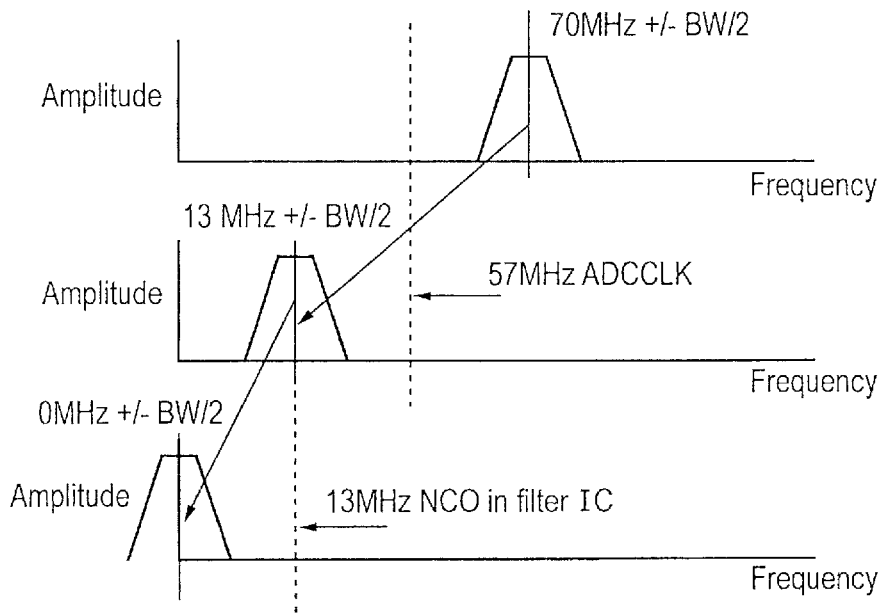
FIG. 6 illustrates down-conversion of signals in the embodiment of FIG. 2.
Figure 7:
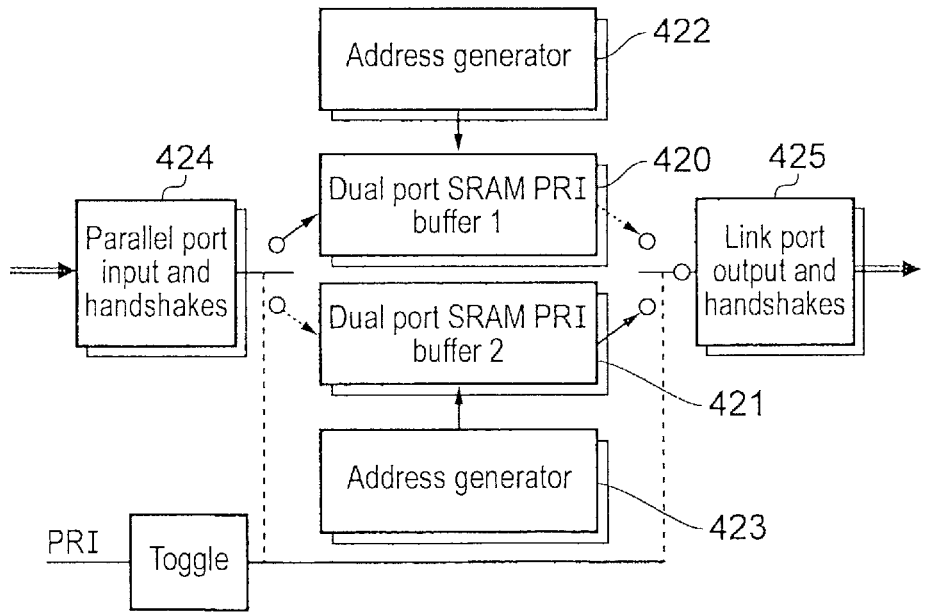
FIG. 7 illustrates data buffering in the embodiment of FIG. 2.

FIG. 6 then illustrates the down-conversion from IF to baseband. The output of the digital filter 406 is in the form of complex I,Q pairs of sample data, which are converted into magnitude form and buffered in the FPGA 412. This buffer is illustrated in more detail in FIG. 7 in which respective dual ports pulse repetition interval (PRI) buffers 420, 421 controlled by respective address generators 422, 423 will receive appropriate inputs via parallel input ports 424 and output via a link port output 425.

Figure 8:
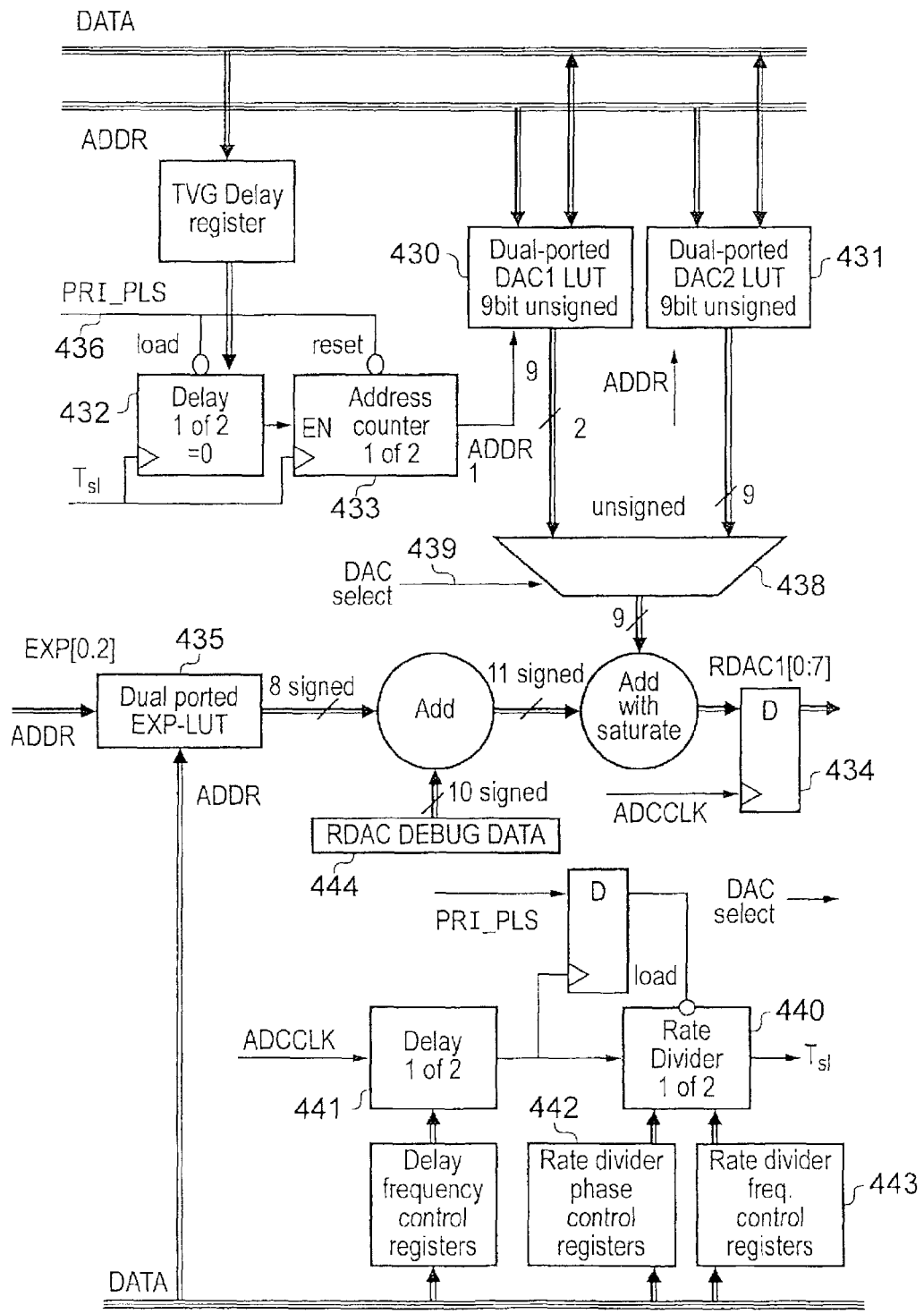
FIG. 8 illustrates the time varying gain generator in FIG. 2.

The TVG generator 401 will now be described in more detail. It should be noted that the TVG generator 401 effectively comprises a plurality of generators for the different ranges at which the radar apparatus is operating. FIG. 8 illustrates the part of the structure of the TVG generator 401 for one such range. There will be similar structures within the TVG generator 401 for each range at which the radar system is to operate.

The TVG generator needs to operate in real-time and thus calculation of the TVG function against time is identical and repeated on each transmitted pulse, for the same instrumented range. In this design one innovation is that the TVG function is implemented digitally using look-up tables. The look-up table contents only require re-calculation on each instrumented range change. The recalculation is the combination of the measured non-linearity of the gain control stages, which is measured at the time of manufacture, and the required range or time dependant gain function, including rain or sea-clutter curves if required. The final function is scaled for the sample rate of the output of the digital filter. These tables are loaded under software control only when the instrumented range is changed.

Those look-up tables are illustrated at 430 and 431 in FIG. 8. In practice, those look-up tables may be implemented in a single table, with different table areas for the two tables 430, 431 illustrated in FIG. 8. Moreover, where there are different TVG generator structures for the different ranges, the look-up tables of the structures for the respective ranges may themselves be combined in a single look-up table, again with different table areas for the different structures.

The loading of the lookup tables in this design is simplified by the use of dual ported SRAMs. These have a second address and data bus that is connected to the microprocessor bus that does not interfere with reading of the lookup tables by the hardware described below. The loading of the tables and error checking if required takes place over this second data and address bus in the same way that normal SRAM is accessed by a microprocessor. The loading of the tables is ignored for the remainder of this discussion.

One gain control stage is normally inadequate to deal with the dynamic arrange of the input signal and preserve linearity in each of the analog stages. in this embodiment a PIN diode attenuator 42 is used before the variable gain amplifier (VGA) 44, to prevent saturation of the input of the VGA 44 for large signals. This gain also needs to be varied with range. Thus the gain control circuit should modify the gain of both the PIN diode attenuator 42 and the VGA throughout the acquisition of a single spoke.

Figure 9:
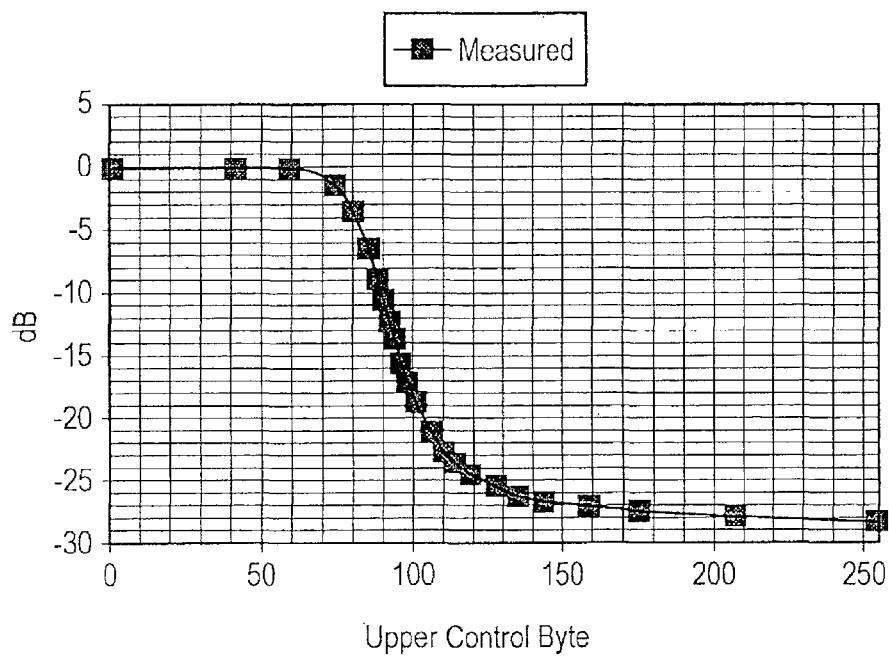
FIG. 9 illustrates the typical characteristic of the PIN diode attenuator shown in FIG. 2.

The PIN diode attenuator 42 is heavily non-linear with a control voltage as illustrated in FIG. 9; thus the lookup table contents for the PIN diode gain control apply the inverse non-linearity to transform the linearly increasing (with range) lookup table address to be the multiplication of the required range dependant gain (typically power gain of $R^4$) and the inverse non-linear function of the PIN diode attenuator.

In FIG. 8, the signal PRI_PLS received on line 436 synchronises the circuit to the start of reception. A delay counter 432 delays the start of the range dependant gain control circuit to cancel the delay in the transmitter. The delay required is loaded from the TVG delay register 437 The read address counter 433 then increments, under control of clock Ts, as time progresses to access the lookup table contents appropriate for that range. In this embodiment the data for both digital-to-analog converters 402, is interleaved, with a multiplexor, over a single 8-bit RDAC bus, the multiplexing normally occurring at a rate faster than the output sample rate of the digital filters.

A multiplexor 438 selects, using the digital-to-analog select signal received on line 439, the output of the appropriate lookup table 430 or 431 dependant on which digital-to-analog converter is to be driven, the digital-to-analog 402 connected to the PIN diode 42, or the digital-to-analog 403 connected to the variable gain amplifier 44.

In a multi-range system, the lookup tables 430 and 431 are made large enough to accommodate the required tables for each of the ranges, and the most significant bits of the table read address are modified to determine which table is to be accessed for the current range to be acquired. The range to be acquired is signalled by the control processor 100 using digital bus 103.

The delay counter 432 is decremented and read address counter 433 is incremented at a rate that can be modified dependant on the output rate of the digital filter, rather than the sample rate of the analog-to-digital converter. This sample rate is not externally accessible for the preferred digital filter used (AD6654); hence it is re-created by division of the analog-to-digital converter clock to produce a clock (Ts) at this rate. Rate divider circuitry 440, delay registers 441, rate divider phase 442 and frequency registers 443 synchronise the clock Ts to commence in synchronism with signal PRI_PLS and to recur at the sample rate, and sample phase applicable to that range. Thus the rate divider and registers are duplicated for each range that may be simultaneously acquired (one of two for dual ranging systems are shown in FIG. 8).

The use of the lower rate, Ts, reduces the number of entries required in the range dependant table. The number of lookup table entries would typically be at least as long as the maximum samples in the digital filter output for the range to be acquired. In practice it is possible to reduce the number of entries. The analog output of the gain digital-to-analog converter 434 is filtered in an analog filter, which provides interpolation. Alternatively, the matching of the range dependant gain function to the desired function can be a stepwise approximation, provided the resulting gain steps are small and may be filtered in a later digital process before the final display.

Simultaneously to range dependant gain control, another lookup table (EXP lookup data) 435 is accessed using the EXP bits as address. These bits are sourced from an AGC circuit that varies the gain of the analog stages to keep the signal within the dynamic range of the analog-to-digital converter. Three bits of EXP are available from the analog-to-digital converter used in this embodiment. Thus in this implementation 8 entries are required in the EXP lookup table 435. The EXP lookup table 435 can be used to control the gain or the EXP table can be set to all zeros to disable this function. Likewise if the analogue gain control circuit is non-linear, then the EXP lookup table 435 can contain the inverse non-linearity, to make the actual gain vary linearly with the value of the EXP bits. The slope of the thus linearised function can be varied to accommodate different scaling. For example the analog-to-digital converter used expects the gain to vary by 6 dB on each increment of EXP.

The analog-to-digital converter used in this implementation, provides EXP outputs to request a gain change in the external analog stages:

The gain in the gain-ranging block (external) is compensated for by relinearizing, using the exponent bits EXP[2:0] of the input port. For this purpose, the gain control bits are connected to the EXP[2:0] bits, providing an attenuation of 6.02 dB for every increase in the gain control output. After the gain in the external gain-ranging block and the attenuation in the AD6654 (using EXP bits), the signal gain is essentially unchanged. The only change is the increase in the dynamic range of the analog-to-digital converter.

The outputs of the selected lookup table 430 or 431 and the AGC lookup tables are added together with saturating logic that ensures the result is kept within the range of the analog-to-digital converter and no over or underflow occurs. The contents of a diagnostic register, RDAC_DEBUG_DATA are added in this path to facilitate testing of the TVG generator 402.

All of the lookup table contents are twos complement numbers that can be added together with the correct result given when negative numbers occur. To ensure the correct timing relationship of the digital-to-analog conversion data and control signals, the RDAC data is resynchronised in register 434 prior to leaving the TVG generator 402.

The instantaneous signal, at a particular range, can still vary due to RCS variation and fading. The overall dynamic range of received radar signals is very large. It comprises the following elements:

Range: The received signal power for a point reflector follows the law $1/R^4$, (Ref. 1) where R is range. From the minimum range of say 50 m to a range of 20 NM, the dynamic range is 115 dB.

The radar cross-section (RCS) of targets of interest varies by 50 dB

Fading and multi-path effects contribute a further 30 dB of variation

Thus the total dynamic range of interest is the sum of these: 195 dB

Fortunately the range variation is predictable. TVG is applied to cancel the effect of the range variation, subject to the limits of thermal noise and variable gain amplifier noise and dynamic range.

The instantaneous signal, at a particular range, may vary due to radar cross section (RCS) variation and fading. In practice there is a requirement for 80 dB of instantaneous dynamic range. The theoretical dynamic range of a 14 bit ADC is 84 dB. Signal processing, including Azimuth integration, is used to retrieve signals below one least significant bit (LSB), to further extend the dynamic range. Thus with full range compensation using TVG, adequate instantaneous dynamic range exists, using such a converter, for fully linear IF processing.

The dynamic range of the radar signal, following signal processing, is still larger than the dynamic intensity range of the display. Dynamic range compression is used, but following the signal processing. A choice of algorithms for compression is then feasible, because the compression is performed in the DSP. These can be log, square root, or in special cases, linear for no compression.

The output data comprises 8 bits (256 levels) that is converted to pseudo-colour in the display's processor.

To facilitate connection of multiple displays, Ethernet is used as the connection from the scanner to the displays.

The Ethernet media access controller/physical layer interface (MAC/PHY) connects to the bus of the digital signal processor and the network software stack runs on the digital signal processor itself, not a separate communications processor. This saves the additional cost and complexity of a multi-processor architecture.

FIG. 2 also shows that the display section 500 of the radar apparatus generates different displays in multiple windows 501, 502, 503 (the total number n of such windows depending on the number of ranges at the which the radar is operated). Each window 501, 502, 503 receives a digital signal from the network unit 411 and displays an images corresponding to one of the ranges of the radar.

Known multiple range radars interleave target detection of ranges on a revolution-by-revolution basis. The radar of this embodiment interleaves detection of targets on different instrumented ranges, and the display of the data for these ranges on a pulse-by-pulse basis. Thus there is simultaneous display of radar images from multiple instrumented ranges that was acquired at virtually the same instant, and is fully time-locked. The images are updated in real time so that the images are not displaying radar data older than that from a fraction of a revolution of the antenna.

Interleaving of radar pulses of different characteristics is known, but the information from the different pulses is used to create separate, simultaneous displays for different instrumented ranges.

Radar pulse characteristics including pulse width and repetition rate have to be optimised for range discrimination or signal to noise ratio dependent on the range to be displayed. Likewise pulses cannot be transmitted until the echoes for that range have been received. The processing of the received signals is filtered to optimise reception for each of the pulses characteristics. Pulses of different types are interleaved on transmission and the targets' echoes received are passed along separate paths. In the receiver each path is separately optimised for that pulse shape. More than one pulse of each type can be transmitted as part of the pulse pattern to permit the higher repetition rates required at shorter ranges. The pulse pattern is arranged to give the required ratio of pulse repetition rates for each range such that the transmitter's duty cycle is not exceeded.

Figure 10:
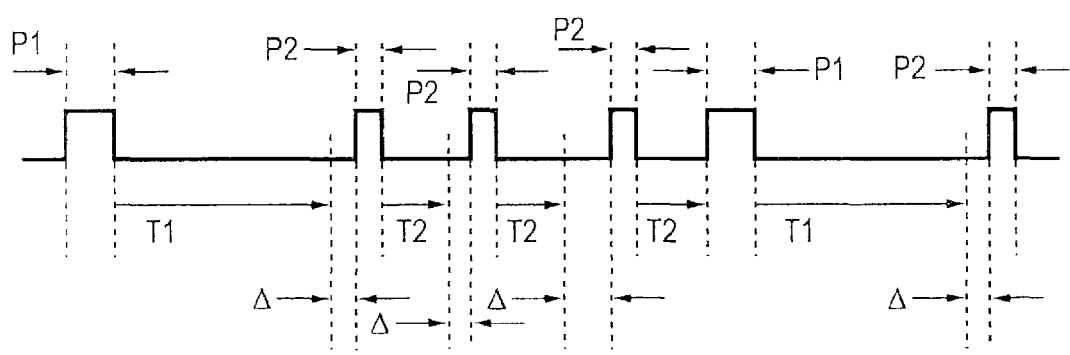
FIG. 10 shows pulse patterns which may be used in the embodiment of the present invention.

A suitable pulse pattern is illustrated in FIG. 10. In FIG. 10 pulses of pulse width P1 is the pulse duration for pulses optimised for a first range, and T1 is the acquisition interval for targets at that range. Similarly, P2 is the pulse duration for pulses optimised for a second range, with T2 being the corresponding acquisition interval. In each case, the acquisition interval follows the corresponding pulse, but is separated from the immediately following pulse by a variable interference rejection inter-pulse jitter period $\Delta$. This de-correlates targets at each range. Tn such an arrangement, the pulse repetition interval is the sum of the pulse duration, the acquisition interval and the maximum value of $\Delta$ for each range.

FIG. 10 shows that the pulses are interleaved, and in this embodiment there are three pulses for the second range between each pulse for the first range. Other combinations are, however, possible. However, table 1 then illustrates a possible pulse pattern, where (a, b) is the number of pulses of each type that are interleaved from (column a, row b).

TABLE 1

| Pattern Range (1) Pulse width (seconds) | Range (2) Nominal PRI (sec) | Pulse width (seconds) Nominal PRI (sec) Mode | 75.0E−9 333.3E−6 1 | 100.0E−9 333.3E−6 2 | 150.0E−9 333.3E−6 3 | 250.0E−9 333.3E−6 4 | 350.0E−9 500.0E−6 5 | 450.0E−9 625.0E−6 6 | 600.0E−9 769.2E−6 7 | 1.0E−6 1.2E−3 8 |
|---|---|---|---|---|---|---|---|---|---|---|
| 75.0E−9 | 333.3E−6 | 1 | 1, 1 | 1, 1 | 1, 1 | 1, 1 | 3, 2 | 2, 1 | 7, 3 | 11, 3 |
| 100.0E−9 | 333.3E−6 | 2 | 0, 0 | 1, 1 | 1, 1 | 1, 1 | 3, 2 | 2, 1 | 7, 3 | 11, 3 |
| 150.0E−9 | 333.3E−6 | 3 | 0, 0 | 0, 0 | 1, 1 | 1, 1 | 3, 2 | 2, 1 | 7, 3 | 11, 3 |
| 250.0E−9 | 333.3E−6 | 4 | 0, 0 | 0, 0 | 0, 0 | 1, 1 | 3, 2 | 2, 1 | 7, 3 | 11, 3 |
| 350.0E−9 | 500.0E−6 | 5 | 0, 0 | 0, 0 | 0, 0 | 0, 0 | 1, 1 | 4, 3 | 3, 2 | 5, 2 |
| 450.0E−9 | 625.0E−6 | 6 | 0, 0 | 0, 0 | 0, 0 | 0, 0 | 0, 0 | 1, 1 | 7, 6 | 11, 6 |
| 600.0E−9 | 769.2E−6 | 7 | 0, 0 | 0, 0 | 0, 0 | 0, 0 | 0, 0 | 0, 0 | 1, 1 | 8, 5 |
| 1.0E−6 | 1.2E−3 | 8 | 0, 0 | 0, 0 | 0, 0 | 0, 0 | 0, 0 | 0, 0 | 0, 0 | 1, 1 |

These patterns are calculated from the ratio of PRIs for each row or column.

In general, the pulse repetition rate (PRI) needs to be sufficient that enough pulses are generated within a suitable time to generate the appropriate displays simultaneously. In general, the pulse repetition must be sufficient that the data in any image is acquired over a time which is not greater than twenty times the longest interpulse period, in the case of FIG. 10 being the period between each pulse P1 for a radar, this duration also needs to be longer than one half of the antenna resolution time. Thus, in the embodiment of FIG. 2, it is necessary that the pulse repetition frequency determined by the control processor 100 is related to the speed of the motor 33. This may be pre-set, or could be based on measurement.

When used with radar, the magnetron transmitter 23 can be replaced by another source of microwaves, such as an oscillator, and high power travelling wave tube amplifier or lower power solid state amplifier. In both sonar and radar, if lower power transmitters are used, it is normal to employ pulse compression to increase the average power transmitted, whilst not reducing the range resolution. The linear receiver used in this is suitable for use with radar and sonar employing pulse compression.

The above embodiment illustrates a radar apparatus. A sonar system embodying the present invention may be similar, although with the antenna 31 replaced by a transducer, and with the magnetron replaced by a high power RF generator. Moreover, the pulse intervals and pulse widths, of Table 1 would then be modified to accommodate the slower velocity of acoustic waves in water to that of radio waves in air.

Figure 11:
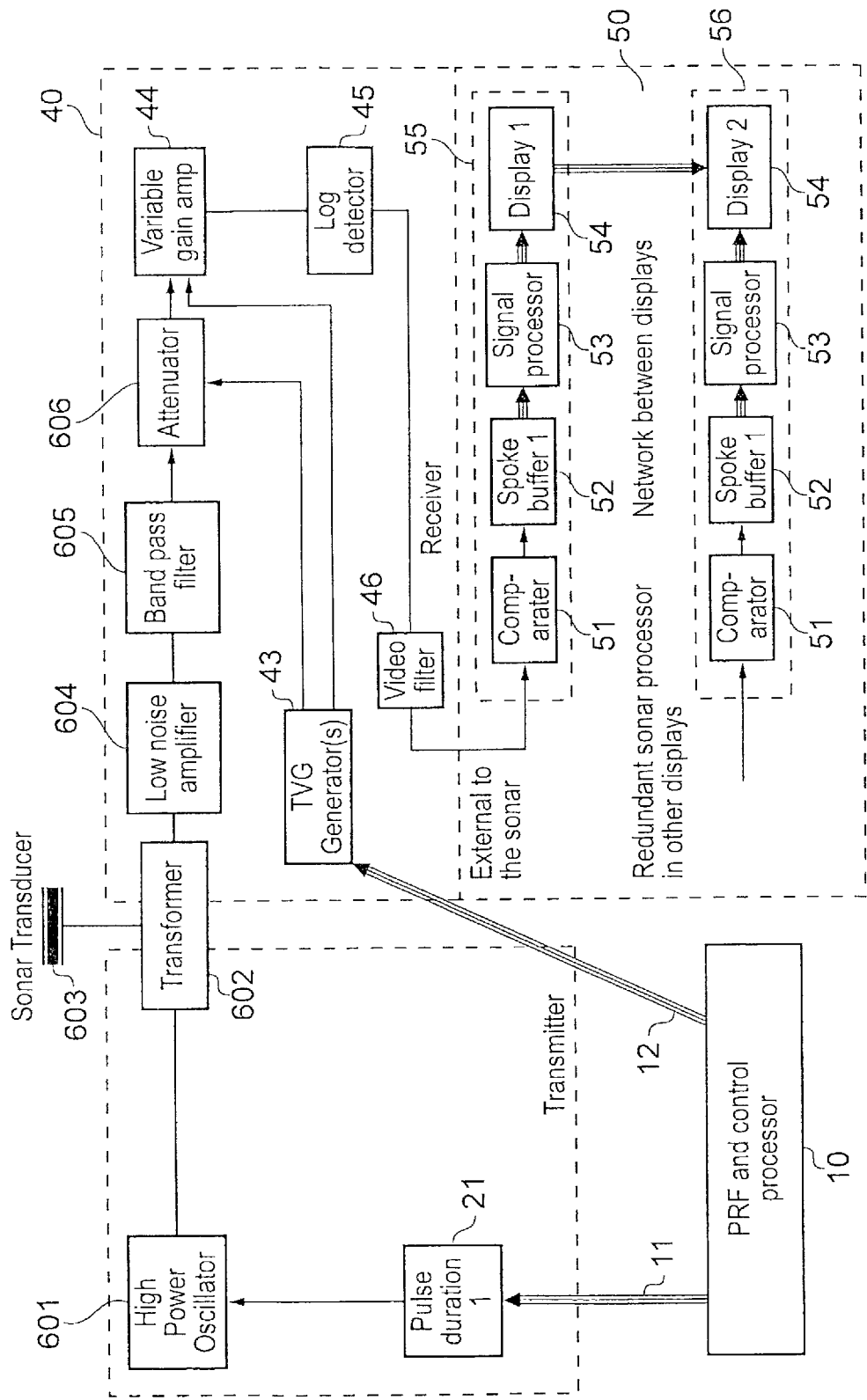
FIG. 11 is a block diagram of a known sonar system, and is similar to FIG. 1.

FIG. 11 of the accompanying drawings shows a known sonar apparatus. Most of the sonar apparatus of FIG. 11 is similar to the radar apparatus of FIG. 1, and corresponding parts will be indicated by the same reference numerals. Thus, the sonar apparatus of FIG. 11 comprises five principal components, namely a processor 10, a transmitter section 20, an antenna structure 603, a receiver structure 40 and a display structure 50. The processor 10 generates pulse initiation signals which are passed via a digital bus 11 to the transmitter section 20. The processor also generates signals for controlling the receiver section 40, which are passed from the processor 10 to the receiver section 40 via a second digital signal bus 12. The display structure 50 of this sonar apparatus is the same as the display structure 50 of the radar apparatus of FIG. 1 and thus will not be described in detail now.

The pulse initiation signals from the processor 10 are received at a pulse duration unit 21 in the transmitter section 20, which determines the pulse width of the pulses to be generated. The pulses are initiated by an edge of the pulse initiation signal, and their duration is thus fixed. This is the same as in the radar apparatus of FIG. 1 however, the resulting pulse information is passed to a high power amplifier 601 which drives a transformer 602 to match the oscillator to the sonar transducer 603. That transformer 602 passes the sonar pulse to the transducer 603 from which they are transmitted. That sonar transducer 603 is normally a piezo-electric device that produces high power acoustic pulses in water, which will form the sonar signals. When return signals are received at the transducer 603, they are passed via the transformer 602 to a low noise amplifier 604 which increases the amplitude of the signals to an appropriate level. Band-pass filter 605 filters the received signals to reduce unwanted noise. Generally, the high power oscillator will produce pulses in the Long and Medium wave-band region 50 to 250 KHz, in which case the band-pass filter will be tuned to the appropriate centre frequency.

The signals from the band pass filter 605 are passed to an attenuator 606 which, in a similar way to the PIN alternator 42 of FIG. 1, is controlled by a Time Varying Gain (TVG) generator 43 which is controlled by the processor 10 on the basis of the signals passed via a bus 12. That TVG generator 43 controls the gain of the receiver section 40 to compensate for range variation of the signal received by the transducer. The TVG generator 43 also controls a variable amplifier 44 which receives the output of the attenuator 606 and controls the gain of the received signal. The output of the variable gain amplifier 44 is passed to a log detector 45 which generates an output which is the logarithm of the envelope with a received signal. That output is passed to a selectable band filter (video filter 46) which generates the output to the display section 50.

Figure 12:
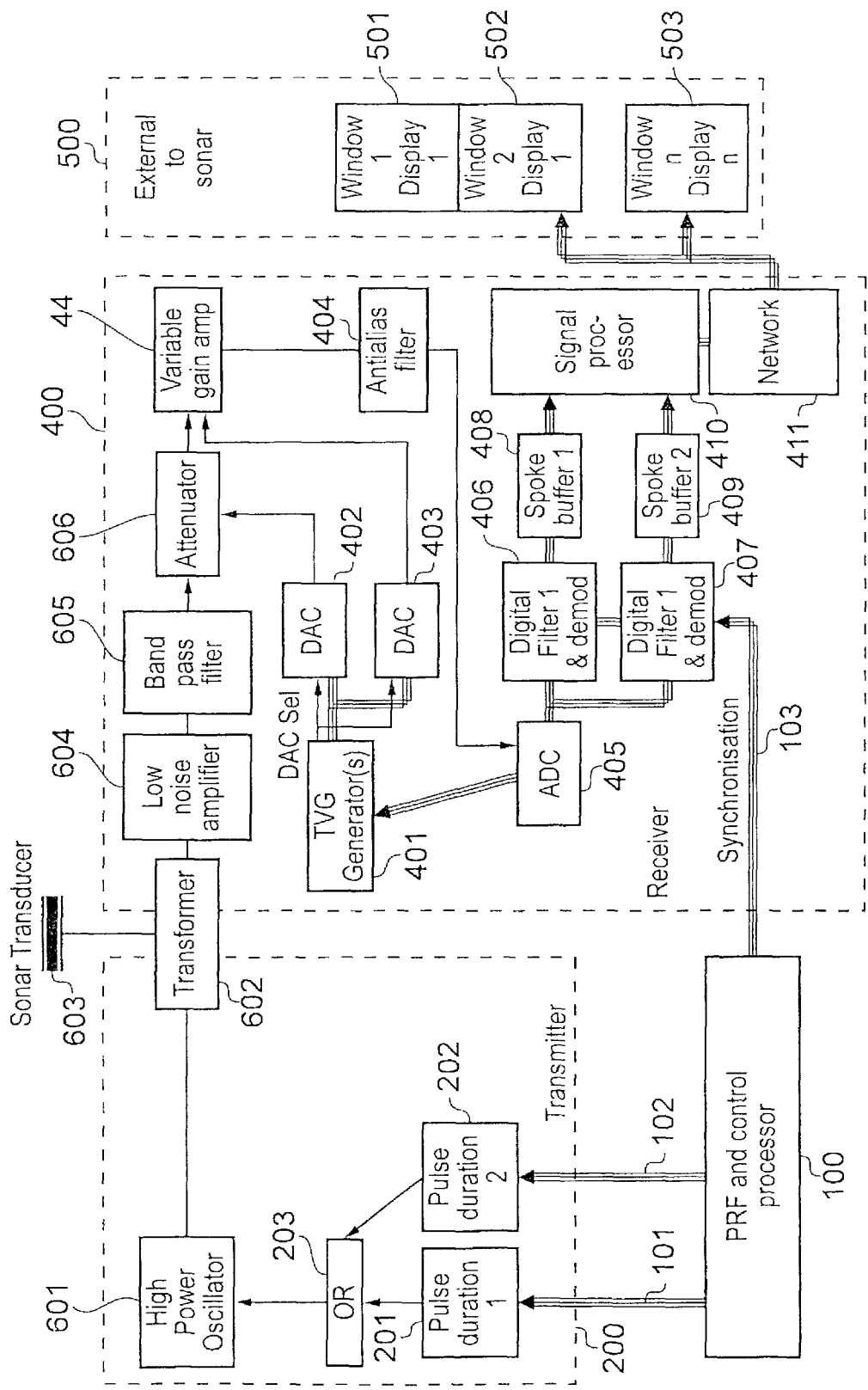
FIG. 12 is a block diagram of a sonar apparatus embodying the present invention, and is similar to FIG. 2.

A sonar apparatus embodying the various aspects of the invention will now be described in detail. FIG. 12 shows the general structure of the apparatus of this embodiment. Again, most of the sonar apparatus of FIG. 12 is similar to the radar apparatus of FIG. 2, and corresponding parts are indicated by the same reference numerals. The sonar apparatus of FIG. 12 also has many of the features of the sonar apparatus of FIG. 11, and again corresponding parts are indicated by the same reference numerals. Thus, the apparatus comprises five components, namely a control processor 100, a transmitter section 200, a transducer section 603, a receiver section 400, and a display section 500. The display section of the sonar apparatus of FIG. 11 is the same as the display section 500 of the radar apparatus of FIG. 2, and so will not be described in detail now.

Unlike the sonar apparatus of FIG. 11, the apparatus of FIG. 12 is intended to generate multiple displays at different sonar ranges. Thus, the control processor 100 generates two types of pulse repetition frequency signals which are transmitted via separate digital buses 101, 102 to separate pulse duration units 201, 202. Each of those pulse duration units 201, 202 determines the duration of the respected pulses, in a manner similar to pulse duration unit 21. However, the duration of the pulses generated by the pulse duration units 201, 202 will be different. The resulting signals are combined by a logical OR component 203 before being passed to the high power oscillator 601. The pulses are generated so that they are interleaved, with the manner of interleaving being determined by the desired ranges of images to be displayed.

In the arrangement of FIG. 12, the structure of the transducer section 603 is similar to the transducer section 603 of the arrangement of FIG. 11. As in the arrangement of FIG. 11, the transducer 603 receives signals from the high power amplifier 601 via the transformer 602. The return signals received by the transducer 602 are passed via the transformer 602, a low amplifier (LNA) 604 a band-pass filter 605, an attenuator 606 to a variable gain amplifier 44. However, the output of that variable gain amplifier 44 is processed in a different way from the arrangement of FIG. 11, namely in the same way as the output of the variable gain amplifier 44 is processed in the embodiment of FIG. 2.

In the embodiment of FIG. 12, the time varying gain (TVG) generator 401 is implemented using a series of combination of fixed and variable gain amplifiers and an attenuator. Again, the TVG generator 401 is controlled using signals from the control processor 100 via a digital bus 12. However, in this embodiment, the output of the TVG generator 401 is converted by respective digital-to-analog converters 402, 403 to control the attenuator 606 and the variable gain amplifier 44 respectively.

As mentioned above, the output of the variable gain amplifier 44 is processed in the same way as the output of the variable gain amplifier 44 in the embodiment of FIG. 2. The components of the receiver section 400 and display section 500 which process signals from the variable gain amplifier 44 are the same in FIGS. 2 and 11. Thus, the processing of the signals is as described with reference to FIGS. 3 to 10. Normally, there will then be differences in the display generator, since radar apparatuses tend to generate circular display, which is not appropriate for sonar arrangements. Also, as previously mentioned, the pulse intervals and pulse widths of Table 1 would have to be modified to accommodate the slow velocity of acoustic waves in water, as compared with radio waves in air. However, these differences do not affect the signal processing described with reference to the first embodiment.

The invention claimed is:

1. An apparatus comprising:
   a modulator for generating a sequence of pulse signals;
   a transmitter for converting the sequence of pulse signals to ranging signals;
   an antenna for emitting the ranging signals and receiving return signals;
   an amplifier for amplifying the return signals;
   a switching device for switchedly interconnecting the transmitter to the antenna and the antenna to the amplifier;
   a signal processor for processing the amplified return signals for display and/or analysis, wherein the apparatus comprises either a radar apparatus that provides the ranging signals as radar signals or a sonar apparatus that provides the ranging signals as sonar signals;
   an analog-to-digital converter for converting the amplified return signals to digital signals; and
   a linear receiver comprising a linear demodulator for generating a digital output in response to the digital signals for processing by the signal processor.

2. An apparatus according to claim 1 wherein said linear receiver comprises a plurality of linear amplifiers.

3. An apparatus according to claim 1, further comprising an anti-aliasing filter connected to the amplifier for filtering the amplified return signals, wherein the analog-to-digital converter is a sub-sampling analog-to-digital converter for converting the filtered digital signals to the digital signals.

4. An apparatus according to claim 3, wherein said anti-aliasing filter is arranged to restrict the bandwidth of the amplified return signals to satisfy the Shanon-Nyquist-Kotelnikov sampling theorem.

5. An apparatus according to claim 3, further comprising a digital filter for filtering said digital signals from said sub-sampling analog to digital converter.

6. An apparatus according to claim 1, further comprising a display arranged to show a pseudo-colour representation of the amplitude of said return signals from the output of said signal processor.

7. An apparatus according to claim 1, further comprising an anti-aliasing filter connected to the amplifier for filtering the amplified return signals, wherein the analog-to-digital converter is an analog-to-digital converter for converting the filtered signals to the digital signals, wherein the signal processor is a digital processor comprising a network stack running in the digital processor.

8. An apparatus according to claim 1, further comprising:
   an anti-aliasing filter connected to the amplifier for filtering the amplified return signals, wherein the analog-to-digital converter is an analog-to-digital converter for converting the filtered signals to the digital signals, wherein the signal processor is a digital signal processor; and
   a network interface media access controller and a physical layer interface that are connected to a digital signal processing bus.

9. An apparatus according to claim 1, wherein said apparatus is a radar apparatus and said radar apparatus further comprises an antenna drive for rotating the antenna with a predetermined revolution duration;
   wherein the modulator is arranged to generate the sequence of pulse signals such that the sequence comprises pulses of a first pulse pattern and pulses of a second pulse pattern, the first and second pulse patterns differing in pulse duration and inter-pulse spacing, the first and second pulse patterns being interleaved such that within said predetermined revolution duration there are a plurality of pulses of each pulse type; and
   wherein the signal processor is arranged to generate first radar image from the amplified return signals associated with said pulses of said first pulse type and a second radar image from the amplified return signals associated with said pulses of said second pulse type, such that the pulses of the first and second pulse types at any time are within a time not greater than one half of the predetermined revolution duration.

10. An apparatus according to claim 1, wherein said apparatus is a radar apparatus and said radar apparatus further comprises an antenna drive for rotating the antenna with a predetermined revolution duration;
    wherein the modulator is arranged to generate the sequence of pulse signals such that the sequence comprises pulses of a first pulse pattern and pulses of a second pulse pattern, the first and second pulse patterns differing in pulse duration and inter-pulse spacing, the first and second pulse patterns being interleaved such that within said predetermined revolution duration there are a plurality of pulses of each pulse type; and
    wherein the signal processor is arranged to generate a first radar image from the amplified return signals associated with said pulses of said first pulse type and a second radar image from the amplified return signals associated with said pulses of said second pulse type, such that the pulses of the first and second pulse types at any time are within a time not greater than twenty times whichever is larger of the pulse spacing of the first and second pulse patterns.

11. An apparatus according to claim 1, wherein said apparatus is a sonar apparatus and the modulator is arranged to generate the sequence of pulses and that the sequence comprises pulses of a first pulse pattern and pulses of a second pulse pattern, the first and second pulse patterns differing in pulse duration, pulse spacing, and being interleaved; and
    wherein the signal processor is arranged to generate a first sonar image from the amplified return signals associated with said pulses of said first pulse type and a second sonar image from the amplified return signals associated with said pulses of said second pulse type, and that the pulses of the first and second pulse types at any time are within a time not greater than twenty times whichever is longer of the pulse spacing of the first and second pulse patterns.

12. An apparatus according to claim 1, further comprising a controller for controlling the gain of the amplifier, the controller comprising at least one look-up table containing data for compensating for any range-dependent variation of said return signals.

13. An apparatus according to claim 12, wherein the apparatus is configured to operate at multiple ranges and wherein there are multiple look-up tables, each range having a corresponding look-up table.

14. An apparatus according to claim 12, wherein the apparatus is configured to operate at multiple ranges and wherein said at least one look-up table has multiple table regions, each range having a corresponding table region.

15. An apparatus according to claim 6, wherein said amplifier has a plurality of gain stages, and wherein there are a plurality of said look-up tables, each table corresponding to one of said gain stages.

16. An apparatus according to claim 12, wherein said amplifier has a plurality of gain stages, and wherein said at least one look-up table has a plurality of table regions, each table region corresponding to one of said gain stages.

17. An apparatus according to claim 15, further comprising an adder configured to add together outputs from said plurality of look-up tables for said plurality of table regions and saturation logic arranged to be applied to the added-together outputs, wherein an appropriate gain stage of said amplifier is determined on the basis of the saturation logic.

18. An apparatus according to claim 1, wherein said apparatus is a radar apparatus and said signal processor is a digital signal processor arranged to generate a digital output which comprises greater than eight levels of radar video.

19. A radar apparatus according to claim 18, further comprising means for subjecting said digital output of said digital signal processor to non-linear dynamic range matching.

20. A radar apparatus according to claim 1,
wherein the ranging signals and the received return signals are X-hand signals;
the radar apparatus further comprises a converter for converting the X-band return signals to intermediate frequency return signals;
wherein the amplifier operates on the intermediate frequency return signals;
wherein the filter operates on the amplified intermediate frequency return signals; and
wherein the sub-sampling analog-to-digital converter samples the filtered amplified intermediate frequency return signals at a sample rate less than the intermediate frequency.

* * * * *